United States Patent [19]

Miller et al.

[11] 3,994,379
[45] Nov. 30, 1976

[54] SELF-ADJUSTING ELECTROMAGNETIC CLUTCH

[75] Inventors: Donald L. Miller; Paul F. Giometti, both of Horseheads, N.Y.

[73] Assignee: Facet Enterprises, Inc. Motor Components Division, Elmira, N.Y.

[22] Filed: June 16, 1975

[21] Appl. No.: 587,443

[52] U.S. Cl. ............................ 192/111 A; 188/71.9; 192/84 C
[51] Int. Cl.² .................. F16D 13/75; F16D 27/10
[58] Field of Search ..................... 192/84 C, 111 A; 188/71.9, 196 V

[56] References Cited
UNITED STATES PATENTS

| | | | |
|---|---|---|---|
| 3,677,377 | 7/1972 | Miller | 192/111 A X |
| 3,679,034 | 7/1972 | Miller | 192/111 A |
| 3,724,619 | 4/1973 | Miller | 192/111 A X |
| 3,789,966 | 2/1974 | Miller | 192/111 A |

*Primary Examiner*—Allan D. Herrmann
*Attorney, Agent, or Firm*—Remy J. VanOphem

[57] ABSTRACT

An electromagnetic clutch device for transmitting torque from an input means to an output means. The clutch actuating means includes an electromagnetic winding, a driving plate, an armature coaxially disposed with the input means and threadedly connected to a driving friction ring member, said armature responsive to said electromagnetic winding and said friction ring member being allowed to advance on said armature for driving the ouput means. The relative rotational motion between the armature and the driving friction ring member causes the friction ring member to advance on the thread until full engagement with the drive output means is attained. The relative position between the armature and the driving friction ring member is maintained by a retarder disposed between the armature and the driving plate. The retarder permits relative rotational motion between the driving friction ring member and the armature in one direction and prevents relative motion between said armature and ring member in the other opposite direction.

7 Claims, 4 Drawing Figures

SELF-ADJUSTING ELECTROMAGNETIC CLUTCH

BACKGROUND OF THE INVENTION

The present invention relates to electrically operated friction devices and controls therefor and more specifically to an electromagnetic self-adjusting clutch.

Electromagnetic clutch devices have been found to be particularly desirable in applications such as truck vehicles, in which the transmission of power to the cooling fan must be controlled by a device having considerable compactness. Such applications place particular requirements on the fan clutch in that it must be simple and economically constructed and at the same time provide a high torque output to enable the cooling fan to provide sufficient air flow across the engine thereby maintaining the engine's temperature below a predetermined limit. The clutch in such a system may be either off or on for long periods of time or cycled on and off for short periods of time depending on the output power and vehicle speed and, therefore, the clutch must be sufficiently durable to withstand constant use with a minimum amount of wear. Although known electrical magnetic clutches have proven to be successful in meeting the above requirements, the instant invention is concerned with an improvement in construction which enables operation of the clutch device without adverse wear effects on the armature and further, the invention provides an unlimited wear adjustment of the clutch surface without adversely affecting the force necessary to maintain the output torque.

Heretofore, there have existed at least two recognizable types of electromagnetic clutch constructions; one herein called the "cone" variation and the other herein called the "disc" variation. In the cone type interengaging friction surfaces between engageable rotatable clutch elements are conically shaped and by their inherent geometrical configuration require a lower axial force to develop sufficiently frictional locking of the working faces for rotation of the fan or driven member. In the disc type the interengaging friction surfaces are generally disposed normal to the axis of the engageable rotatable clutch element and in instances where the flux path passes through the working faces, the armature pull is entirely axial. The disc construction is particularly advantageous due to the flexibility for providing large axially directed flux path and thereby providing for a stronger clutch engaging force.

Other prior art designs are known which combine the desirable characteristics of the two known types of electromagnetic type constructions mentioned above. One such design provides an armature ring element which has a generally L shaped radial cross section; the element has one annular pole piece with a frustro-conical face and another annular pole piece with a flat disc-like face disposed normal to the clutch axis. This design, however, had several disadvantages. For example, since the armature ring element was one piece, there was no means for compensating for wear of either pole piece. Further, with the above-mentioned design, the conical friction surface must be made from a magnetic material. Yet another disadvantage results from this design in that the outer magnetic pole force is almost in the radial direction instead of the preferred axial direction.

Another design uses the same principle; threading the conical pole piece to the disc-like pole piece. This design added yet one more disadvantage to those listed above. By forcing the flux path to pass through the thread, there must necessarily be an even greater loss in the generated clutching force.

A further prior art design provides a conical frictional element which was moved into engagement with a mutually engageable conical face on an output member by the use of a resilient torque transmission member. The resilient torque transmission member provides a sufficient force to disengage the mutually engageable conical surfaces when the electromagnetic force becomes deenergized. Since the force of the resilient disengaging torque transmission member was in a direction opposite to the direction of the force generated by the electromagnetic flux path, out of necessity it required a greater electromagnetic force to engage the mutually engageable frictional torque transmitting faces. Therefore, as wear occurred, the electromagnetic force required to engage the frictional faces became of a higher magnitude since the resilient torque transmitting member had to be deflected a greater distance. Further adjusting for wear on such prior art device caused adverse wear on the armature face opposite the pole face. This was a result of the centrifugal force acting on the adjusting means. The centrifugal force caused the adjusting means to be somewhat delayed thereby causing the pole face of the output member to come in contact with the armature while rotating for a sufficient duration of time to cause adverse wear on the armature face.

SUMMARY OF THE INVENTION

The present invention relates to an electromagnetic clutch device for transmitting torque from an input means to an output means. The clutch actuating means includes an electromagnetic winding, an armature coaxially disposed with the input means and threadedly connected to a driving friction ring member, said armature responsive to said electromagnetic winding, said friction ring member being allowed to advance on said armature for driving the output means. The torque is transmitted from the input means to the driving friction ring member through an annular torque transmitting member of driving plate mounted coaxially with said input means. Engagement of the driving friction ring member to the output means without adverse affect of wear on the armature is caused by a retarder disposed between said driving friction ring member and said armature. The interrelationship of the driving ring member, the annular torque transmitting member, the retarder and the armature provide for transmitting torque from the input means to the output means without adversely affecting the armature face.

It is a primary object of this invention to provide an electromagnetic clutch having high torque load capacity in a clutch housing of substantially smaller diameter.

It is a further object of this invention to provide a selfadjusting electromagnetic friction device with wear compensating means that are not adversely affected by centrifugal force and do not adversely affect the high magnetic engaging force characteristics. Thus, a strong magnetic engaging force is guaranteed regardless of the wear exhibited by the driving friction ring member which is the principle torque transmitting member.

Another object of this invention is to provide an electromagnetic clutch in which the electromagnetic engaging force is unaffected by wearing of the torque carrying members.

It is another object of this invention to provide an electromagnetic clutch which combines the desirable features of both the disc and cone type electromagnetic friction devices. Thus, the mutually engageable frictional surfaces can be designed to be conical like the "cone" type of friction device or the engaging frictional surfaces can be disposed normal to the axis of the engageable rotatable clutch elements.

Still a further object of this invention is the provision of a unique and simplified wear adjusting means to automatically maintain the clutch armature in close relative engagement with the electromagnetic pole faces regardless of the wear experienced by the torque transmitting friction member.

It is another object of this invention to provide an efficient electromagnetic clutch with a new and economical wear compensating means.

Other objects and advantages of this invention will become apparent from the following detailed description taken in conjunction with the accompanying drawings.

DESCRIPTION OF THE PREFERRED EMBODIMENT

Figure 1:
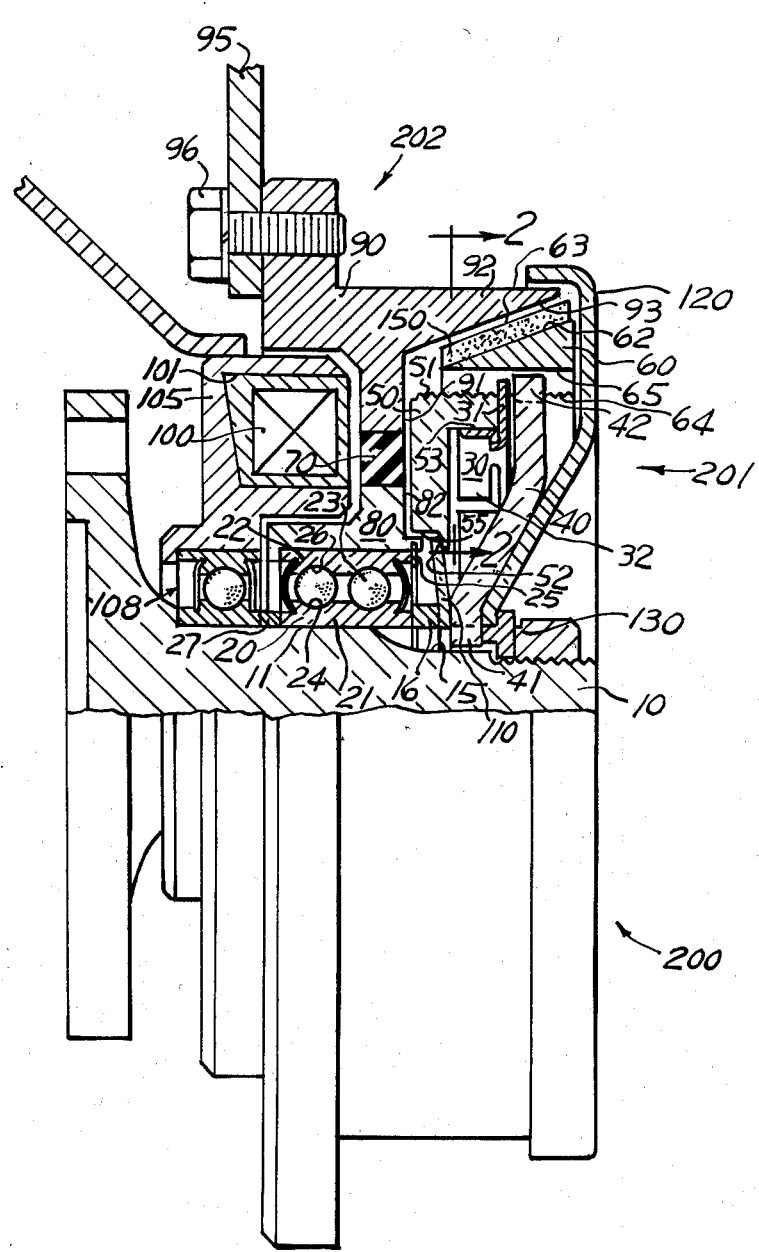
FIG. 1 is a partial sectional view of the preferred embodiment of the invention showing the clutch elements in the disengaged position.

Referring to FIG. 1, there is shown an electromagnetic friction device 200 adapted to transmit torque from an input means 201 to an output means 202 thereby driving the output means and any elements attached thereto, such as an automotive vehicle cooling fan 95. The output means could be a shaft or some other device which would utilize the rotative power transferred to the output means by the input shaft through the clutching device.

The electromagnetic friction device is comprised of a generally rotatable driving motor input means 201 and generally rotatable or driven output means 202. The driving input means 201 is movable axially to provide frictional engagement with the output means 202. The output element 95, denoted here by the fan blade, is secured to the outer section 90 of the output means be a plurality of bolts 96. The output means 202 is comprised of three concentric annular elements 70, 80 and 90 which form one integral rotatable body. In order to establish two separate flux conducting surfaces, the radially inner member 80 of the output means is separated from the radially outer member 90 of the output means by a nonconductive ring 70. This specific feature of electromagnetic clutches, that is, establishing two poles, is a well known principle in the art.

The nonconductive ring 70 may be manufactured from various nonmagnetic materials, such has stainless steel, brass, etc. The annular inner member 80 of the output means 202 is rotatably mounted by a bearing means 20 upon a cylindrical hub 11 of the input shaft 10. The bearing means 20 is disposed between the hub 11 and the inner member 80 of the output means 202. The bearing means 20 comprises inner and outer races 21, 22, each race being secured against axial movement by cooperation of a snap ring 25, a shoulder 81 provided on the inner surface of inner body member 80 and a spacer 27 mounted on the outer surface of the hub 11. A plurality of ball bearings 23 are located within the annular grooves 24 provided in the internal surface of the inner race 21. This permits the radially inner member 80 to maintain proper alignment with the input shaft 10 and also provides for the output means 202 to rotate on the input shaft 10. The inner member 80 has a pole face 82 which is normal to the input shaft axis and parallel to the annular clutch armature 50. The outer member 90 of the output means 202 also has a pole face 91 disposed normal to the clutch axis and parallel to the annular armature 50. One end of the outer member 90 has a frusto-conical annular section 92 which cooperates with the principle torque transmitting cone member or friction ring member 60. Annular section 92 has a frustro-conical surface 93 which is tapered radially inwardly toward the interior of the central axis of the friction device. The outer member section 92 is the principle torque carrying member of the output means 202. Although the outer member section 92 is shown as being integral and a part of outer member 90, it is possible to form the annular section 92 from a friction material and secure it to outer member 90, or fasten a friction material to the frusto-conical face 93 of the member section 92. The use of magnetically nonconductive materials for the torque carrying member of the output means 202 is possible since the flux path is not required to pass through the torque transmitting surfaces 93, 63 of the clutch.

The clutch actuating means comprises a flux conducting section 82, 91 of member 80 and 90 of the output means 202, an electromagentic winding 100 and a flux conducting housing 105 for the electromagnetic winding 100. The electromagnetic winding, or coil 100, is disposed within a cavity 101 of the housing 105 and is contained therein by any suitable adhesive, such as epoxy. The coil 100 may be manufactured from copper wiring or other suitable material and is suitably connected to a DC power source and an electrical control means (not shown). The housing 105 is axially fixed and nonrotatably mounted with respect to the hub 11 of the input shaft 10 in a manner similar to that described above for mounting the output means 202 by using a bearing means 108.

The clutch driving or input means 201 is essentially comprised of six parts; an input shaft 10, a resilient member 110, an armature member 50, a retarder member 30, a principal torque transmitting cone member or friction ring member 60 and a driving plate 40. The driving plate 40 and the resilient member 110 are mounted directly to the input shaft 10. The driving plate has a plurality of tabs on the inner most diameter 41 which mount into a plurality of axial grooves 15 on the outer diameter of the hub 11 of the output shaft 10. The driving plate 40 also has a plurality of tabs 42 equally spaced on the outer diameter. The purpose of the tabs 42 will be discussed in the following paragraphs. The resilient member 110 is mounted on the hub diameter 11 of the output shaft 10. A suitable spacer 16 is used to provide clearance between the resilient member and a lock washer 25. A locking means 130 is used on the shaft to provide sufficient force to maintain the resilient member 110 between the spacer 16 and the driving plate 40 securely. The mounting of the resilient member allows the resilient member 110 to act upon the armature 50 as a return spring when the electromagnetic winding 100 is deenergized. The resilient member 100 exerts a force upon the armature 50 in a direction away from the pole faces 82, 91 so that when the electromagnetic winding 100 is deenergized, the spring force of the resilient member moves the armature 50, friction ring cone member 60 and the retarder 30 in an axial direction away from the pole faces 82, 91.

The principle torque transmitting member is an annular frustroconical friction ring 60 which is coaxially mounted to the tabs 42 on the outer diameter of the driving plate 40 and permitted to move axially with respect to the driving plate 40 by a plurality of axial grooves 65 along the friction ring's inner diameter. The axial grooves or splines correspond to the number of tabs 42 on the outermost diameter of the driving plate 40. The radially outer surface of the friction cone or frustro-conical member 60 has a frustro-conical face 62 to which is mounted to a friction material using any suitable adhesive or mechanical bond. The friction material 92 is adapted to frictionally engage with the mating frustro-conical face 93 of the outer section 90 of the driven or output means 202. The cylindrical internal surface 64 of the friction cone 60 is threaded entirely therealong. The thread can be of conventional screwthread form or of ball thread form. Since the friction cone member 60 is not in the flux path of the electromagnetic clutch, the cone member may be fabricated from a wide selection of magnetically nonconductive materials to which can be attached, by a mechanical or adhesive bond, a friction material, such as the one shown in the preferred embodiment. The friction material in the preferred embodiment is organic material; thus, clutch torque, cluth life and operational noise is optimized to an extent never before possible even with clutches of similar design.

Figure 2:
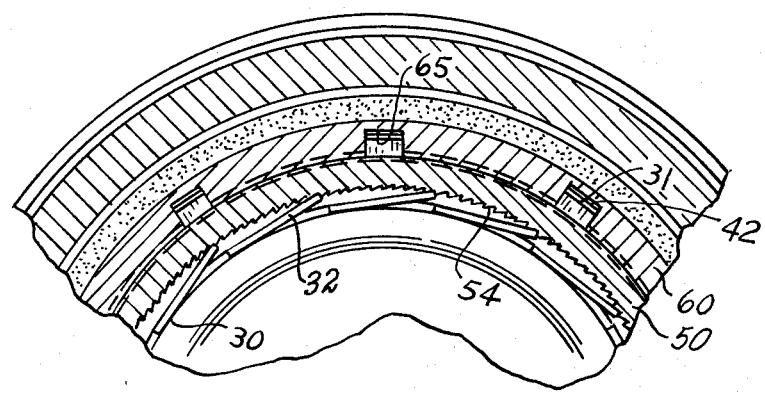
FIG. 2 is a fragmentary sectonal view taken along Section 2—2 in FIG. 1 showing the interrelated means of the retarder armature, friction cone and driving plate.

Between the friction cone 60 and the resilient member 110 is mounted an annular armature 50. The armature 50 has a radially outer surface 51 threaded along its entire length. The thread 51 cooperates with the thread 64 on the friction cone member and, therefore, the armature is mounted so as to be received within the threaded surface 64 of the friction cone member 60. The innermost diameter of the armature ring has a shoulder 52 upon which the resilient member 110 acts when the armature is electromagnetically pulled into the pole faces 82 and 91. When the electromagnetic force is removed, the resilient member's force 110 acts in the axial direction at shoulder 52 to return the armature 50, friction cone member 60 and retarder 30 to a rest position away from the pole faces 82 and 91. The armature is provided with a second inner diameter surface 53 which is located between the innermost diameter surface 55 and the outer diameter 51. This second inner diameter surface has a knurled or ratchet type surface 54 (see FIG. 2) to cooperate with the retarder 30, as will be described below.

Figure 4:
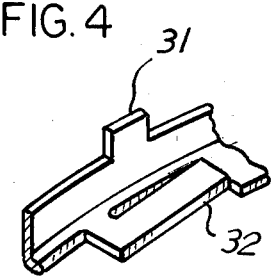
FIG. 4 is a fragmentary perspective view of the retarder member showing the fingers that are part of the retarder which engage with the knurl on the inner diameter of the armature to provide the adjusting feature.

It becomes obvious from looking at the preferred embodiment that as the frictional material 50 wears away by coming into contact with the frustro-conical surface 93 of the outer section 90, the armature position, with respect to the pole faces, must adjust itself in order to prevent the armature from wearing severely and to maintain the torque characteristics of the device. To accomplish this, an annular retarder member 30 is mounted between the armature and the driving plate 40. The retarder member 30 has a plurality of tabs 31 which are illustrated in detail in FIG. 4 corresponding to the plurality of tabs on the driving plate to mount in the plurality of grooves 65 on the inner surface of the friction cone. The retarder is allowed to move axially with respect to the friction cone member but not rotatably. The outer surface of the retarder 30 on one end portion has a plurality of spring-like fingers 32 biased to provide a force in a radial direction (see FIG. 4). These spring-like fingers come into contact with the second inner diameter surface 53 of the armature 50. The knurl 54 on the inner surface 53 of the armature 50 is manufactured in a way whereby the armature 50 will thread itself along the thread 51 on its outer surface when rotated in one direction, with respect to the retarder member 30, but will be prevented from rotating in the opposite direction by the spring-like bias force of the fingers which act like a ratchet upon the knurl portion of the inner diameter. Therefore, the spring-like fingers 32 will allow the armature to rotate with respect to the friction cone, driving plate and retarder in one direction but not in an opposite direction. The overall affect of the action of the spring-like fingers 32 on the knurled inner diameter 53 of the armature 50 is to prevent adjustment of the armature with respect to the pole faces 82, 91 except as wear occurs. As wear occurs on the friction material 150, the armature threads itself along the inner diameter of the friction cone. The action of the retarder fingers on the knurled portion of the armature inner diameter 53 comprises the selfadjusting wear compensating feature of this invention. It should be noted that the retarded fingers can be provided in either direction and obtain the same retarding effect. The armature shown in the preferred embodiment is in a disengaged mode with the friction cone 60 being fully withdrawn. It will be noted that the armature and retarder adjusting means will allow the armature to thread itself completely into the friction ring member and thereby use the full extent of the friction material mounted to the friction cone without any adverse affect upon the torque output of the friction device or without adverse wear between the armature and the pole faces.

A cover 120 is provided to prevent dirt from getting onto the friction surfaces or into the driving means of the clutch. The cover is mounted onto the shaft 10 between the driving plate 40 and the locking means 130.

OPERATION

In operation, the armature 50 is moved axially into engagement with the pole faces 82, 91 of the driven or output means 202 when the electromagnetic winding 100 is energized. The magnetic engaging forces exerted on the armature are completely axial and, therefore, provide a closed contact between the pole faces and the armature. At this time the friction cone member 60 remains axially spaced apart from the mating surface 93 of the output means of the driven means. As the armature moves axially toward the pole faces 82, 91, the rotational velocity of the armature is decreased by the static condition of the output means. The friction cone member 60, which continues to rotate at the input shaft speed through the driving plate 40, is caused to move axially forward along the mutually engageable thread 64, 51 between the friction cone member 60 and the armature 50 toward the output means due to the small difference in speed between the armature and the friction cone member thereby advancing the surface 53 of the driving friction cone member 60 into engagement with its mating surface 93 of the output means 202. The armature remains in closed contact with the pole faces 82, 91 of the driving means 201 and the air gap between these two members is reduced to practically zero as the armature moves axially toward the pole faces. Simultaneously, as the armature threads itself along the friction cone member, almost all the torque is transferred from the driving means to the driven means by the mating frictional surfaces 93, 63 of the driving friction cone member 60 and the output means 202. The driving plate or torque transmitting member 40 provides a direct mechanical link between the friction ring member 60 of the input shaft 10.

Whenever the electromagnetic winding is deenergized, the armature 50 and the driving friction cone member 60 are axially withdrawn from the output means 202 under the influence of a biasing force applied by the fixed spring 110 mounted on the input shaft 10. Upon becoming deenergized, the armature and friction cone member rotate at the same speed. Relative motion between the two elements is not possible due to the nature of the design of the retarder member 30. The fingers 32 of the retarder act upon the knurled surface 54 of the armature 54 of the armature 50 in such a way so as to prevent relative movement between the armature and friction cone member upon deenergizing of the electromagnetic coil. The armature and friction cone member, with respect to each other, therefore, remain in exactly the same position as in the prior energized position. Therefore, when the electromagnet is again energized, the armature and cone member will move toward the pole faces 82, 91 and the frictional surface 93 respectively and the same basic relative position between the frictional surface 93 on the outer member section 92 and the friction material surface 63 of the cone member is reestablished.

The retarder members will only permit the armature to rotate in one direction relative to the friction cone member. The only way relative motion between the friction cone member and the armature will be permitted to occur is when the frictional surface wears away. As wear occurs, the same basic cycle as described above occurs and continues to occur until all of the frictional material wears away. Note that as wear occurs, there is no loss of torque between the input and output means. The movement between the armature 50 and the driving friction cone member 60 is immediate and automatically adjust the position of the friction cone member to compensate for any wear that occurs at the frictional surfaces 63, 93.

Figure 3:
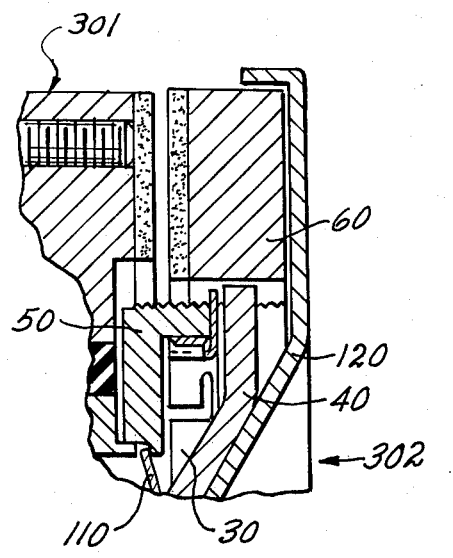
FIG. 3 is a break away view of an alternate embodiment of the invention showing how the invention could be used as a brake mechanism.

In FIG. 3 another embodiment of the invention is illustrated. This embodiment is shown to illustrate the use of the invention as a braking device. The braked member 301 could be any rotational moving body. The braking means 302 is energized through an electromagnet and acts upon the braked member in a similar fashion as described above until the braked member comes to a standstill. When using this device as a brake, the braking means 302 is fixed to prevent rotational movement of the braking means when energizing the electromagnet.

What is claimed is:
1. An electromagnetic friction device for torque transmission comprising:
   input means;
   output means coaxially disposed with said input means;
   driving means for transferring torque from said input means to said output means, said driving means further comprising:
      an adjustable friction ring member, said member having a helical means along its inner diameter, said ring member further having a plurality of angularly spaced axial grooves to permit axial adjustment of said ring member; and
      unidirectional retarder means coaxilly disposed with respect to said adjustable friction ring member, said unidirectional retarder means having a plurality of angularly spaced tabs communicating with the angularly spaced grooves along the inner diameter of the friction ring member;
   an annular magnetic armature, said armature being threadably received in the helical means of said ring member for relative motion therewith;
   means for engaging said friction ring member with said output means; and
   electromagnetic means for actuating said friction device, said means producing a circuitous flux path through said armature when energized.
2. The combination as recited in claim 1 wherein said input means comprises a shaft disposed coaxially with said output means.
3. The combination as recited in claim 1 wherein said helical means comprises a screw thread form.
4. The combination as recited in claim 1 wherein said helical means comprises a ball thread form.
5. The combination as recited in claim 1 wherein said engaging means includes:
   a retarder member disposed coaxially with said armature; and
   means for biasing said armature, said biasing means allowing said armature to rotate in one direction and preventing said armature from rotating in another opposite direction.
6. An electromagnetic clutch apparatus for torque transmission comprising:
   an input shaft;
   output means coaxially disposed with said input shaft and free to rotate thereon, said output means having a frustro-conical friction face tapering radially inwardly and a flat annular pole face disposed normal to the axis of said input shaft;
   clutch actuating means mounted adjacent to said output means, said actuating means including an electromagnetic winding;
   an armature coaxially disposed with said input shaft opposite to said pole face of said output means, said armature being movable axially toward and away from said pole face of said output means in response to said clutch actuating means, said armature having an outer cylindrical threaded surface and an inner cylindrical surface having a first and second portion, said first portion of said inner surface having serrations and said second portion of said inner cylindrical surface having a shoulder portion;

means for biasing said armature in a direction away from said pole face of said output means, said means being adapted to flex axially upon energizing the de-energizing of said clutch actuating means;

a driving friction ring member having an inner cylindrical threaded surface adapted to engage the outer surface of said armature, said inner surface further having a plurality of angularly spaced axial grooves to permit axial movement of said ring member;

an annular torque transmitting member having an outer surface with a plurality of angularly spaced axially aligned protrusions adapted to engage said plurality of axial grooves in said ring member and means for mounting said annular torque transmitting member to the inut shaft; and an annular retarder member disposed coaxially with said armature, said retarder member having means for biasing said armature whereby said biasing means allows rotational movement of said armature in one direction and prevents rotational movement of said armature in another opposite direction;

whereby said clutch actuating means produces a circuitous flux path when energized, said flux path passing through said pole face and said armature moving said armature into engagement with said pole face thereby imparting rotational momentum to said output means, said armature being threadably engaged with said friction ring member such that upon engagement of said armature with said pole face of said output means said armature moves rotatably on said helical thread towards said friction ring member thereby causing said friction ring member to engage said output means until nearly all the torque transmitted between said input shaft and said output means is carried by the mating frictional surfaces of said ring member and said output means.

7. In combination with an electromagnetic clutch of the type wherein torque is transmitted from an input means to an output means upon energizing an electromagnetic coil means and wherein an armature is disposed coaxial with said clutch axis for engagement with a magnetic pole face on the output means, said armature having an outer cylindrical helical threaded surface, the improvement comprising:

an annular driving friction ring member having an inner cylindrical helical threaded surface adapted to engage the outer surface of said armature, said annular member having a plurality of angularly spaced axial grooves to permit axial movement of said annular member with respect to said armature;

means for biasing said armature in a direction away from said pole face of said output means, said means adapted to flex axially upon energizing and de-energizing of said electromagnetic coil means;

a torque transmitting means interposed between said angularly spaced axial grooves of the annular friction ring member and said input means for imparting rotational motion to said annular friction member; and an annular retarder member disposed coaxialy with said armature, said retarder member having unidirectional retarder means whereby said unidirectional retarder means allows the rotational movement of said armature in one direction and prevent rotational movement of said armature in another opposite direction;

whereby upon energizing said electromagnetic coil means said helical threaded cylindrical connection between said armature and said annular friction member causes said armature to move axially and rotatably with respect to said friction member and thereby engage said output means.

* * * * *

UNITED STATES PATENT AND TRADEMARK OFFICE
CERTIFICATE OF CORRECTION

PATENT NO. : 3,994,379

DATED : November 30, 1976

INVENTOR(S) : Donald L. Miller; Paul F. Giometti

It is certified that error appears in the above-identified patent and that said Letters Patent are hereby corrected as shown below:

Page 1, [57], line 14, preceding "output" delete "drive" and insert --driven--;

Column 1, line 40, after "develop" delete "sufficiently" and insert --sufficient--;

Column 2, line 44, after "member" delete "of" and insert --or--;

Column 3, line 57, after "means" delete "be" and insert --by--;

Column 5, line 10, after "winding" delete "100" and insert --110--;

Column 5, line 27, after "mounted" delete "to";

Column 7, line 7, after "advancing' delete " the sur- " and insert --the friction surface 63--;

Column 7, line 8, preceding "of" delete "face 53";

Column 7, line 21, after "60" delete "of"

UNITED STATES PATENT AND TRADEMARK OFFICE
CERTIFICATE OF CORRECTION

PATENT NO. : 3,994,379
DATED : November 30, 1976
INVENTOR(S) : Donald L. Miller; Paul F. Giometti It is certified that error appears in the above-identified patent and that said Letters Patent are hereby corrected as shown below:

and insert --and--;

Column 7, line 32, after first occurrence of "armature" delete " 54 of the armature".

Signed and Sealed this

Eighth Day of March 1977

[SEAL]

Attest:

RUTH C. MASON
Attesting Officer

C. MARSHALL DANN
Commissioner of Patents and Trademarks